Jan. 3, 1961 — E. J. LAWTON — 2,967,137
IRRADIATION OF NYLON
Filed Nov. 21, 1956 — 2 Sheets-Sheet 1

25 x 10⁶ rep

Inventor:
Elliott J. Lawton,
by Paul A. Frank
His Attorney.

United States Patent Office 2,967,137
Patented Jan. 3, 1961

2,967,137

IRRADIATION OF NYLON

Elliott J. Lawton, Schenectady, N.Y., assignor to General Electric Company, a corporation of New York Filed Nov. 21, 1956, Ser. No. 623,702

17 Claims. (Cl. 204—154)

This invention relates to stable, irradiated nylon having reduced elongation, and to the effect of temperature on the high energy irradiation of nylon. Still more particularly, this invention relates to the high energy irradiation of nylon at elevated temperatures. This invention also relates to a process of irradiating nylon which comprises (1) irradiating nylon at about room temperature or below 100° C., and (2) thereupon heating the irradiated nylon to a temperature at which it is less crystalline than at the irradiation temperature or substantially amorphous (also called "annealing"). Cross-linked nylon produced by these methods has permanently reduced elongation while still retaining its original tensile strength.

In application Serial No. 324,555—Lawton et al., filed December 6, 1952, now U.S. Patent 2,858,259, and assigned to the same assignee as the present application, there is described and claimed high energy irradiated nylon having improved form stability at high temperature, improved resistance to solvents, etc. prepared by irradiating nylon with high energy electrons. Although considerable improvement was noted in the physical properties of nylon, the process has certain limitations in that large doses of radiation are required for cross-linking, thus resulting in an expensive process. Furthermore, the cross-linked polymer so produced is susceptible of oxidation.

One problem in using nylon cord for automobile and truck tires resides in the fact that nylon cord has more than the desirable elongation. The method now employed for decreasing the elongation in nylon cord comprises heat-setting stretched nylon at a critical temperature of about 200° C. However, if in processing or in subsequent use, this heat set temperature is exceeded, nylon cord reverts to its original properties, including its original elongation. Furthermore, certain nylon cords prepared from polymerized caprolactam cannot be used as automobile tire cords because its heat-setting temperature of above 200° C. approaches the melting point of the polymer, thus making it impossible to effect reduced elongation by heat-setting. Because of the possibility of reversion in properties, the reduction in elongation obtained by heat-setting as described in the prior art is a temporary and not a permanent property change.

I have now discovered that temperature during and immediately following the irradiation of nylon is important. Thus, I have discovered that the cross-linking effectiveness of an irradiation dose is enhanced by irradiating nylon at elevated temperature, thus effecting a less costly method of producing cross-linked nylon. I have also discovered that nylon is rendered more stable by annealing subsequent to irradiation. In addition, I have discovered that by using the processes of this invention there is obtained cross-linked nylon having permanently reduced elongation not affected by subsequent processing or operating temperatures.

The features of the invention desired to be protected are pointed out with particularity in the appended claims.

The invention itself, together with further advantages resulting from the process, may best be understood by reference to the following description, taken in connection with the accompanying drawing in which.

Nylon as defined herein is a long-chain synthetic polymeric amide which has recurring amide groups as an integral part of the main polymer chain. Thus, nylon refers to an entire family of polyamide resins which are products of the reaction of polybasic acids and polyfunctional amines carried out in such a way that predominately linear polymers are formed. One form of nylon, which is exemplary of the group, is produced from reacting adipic acid and hexamethylenediamine (Nylon 66); other forms are well known to those familiar with the art, for example those formed from butyrolactam (Nylon 4), caprolactam (Nylon 6), etc. Further description of nylon, its preparation, properties and uses can be found in the "Modern Plastics Encyclopedia," published by Plastics Catalogue Corporation of New York, New York (1949), pp. 262–264; in the text by Paul O. Powers entitled "Synthetic Resins and Rubbers," published by John Wiley and Sons, Inc. (1944), 1st Edition, pp. 110–113; and in United States Patents 2,071,250 and 2,071,251, issued to Wallace H. Carothers on February 16, 1937, and assigned to E. I. du Pont de Nemours & Company, Wilmington, Delaware. Nylon is generally highly crystalline at room temperature.

I have discovered that the greater part of the cross-linking in nylon occurs in the amorphous part of the polymer and that crystallinity appears to "trap" free radicals formed by radiation. These crystalline-trapped free radicals do not readily cross-link nylon but activate it so that it is susceptible towards oxidation.

However, I have also discovered that by reducing crystallinity during or after irradiation, such as by rendering the polymer less crystalline or substantially amorphous, that cross-linking efficiency is enhanced and that the trapped free radicals are released resulting in an irradiated polymer which is more resistant to oxidation. Furthermore, these released free radicals instead of rendering the polymer more susceptible toward oxidation are now freed to further enhance the properties of the polymer by additional cross-linking, thus resulting in a reduction of the cost of irradiating. By controlling crystallinity according to this invention there is produced cross-linked nylon having permanent reduced elongation without affecting other properties such as tensile strength, etc. The significance of this discovery is that irradiated nylon is not only rendered less susceptible to oxidation, less expensive to prepare because cross-linking efficiency of the radiation is enhanced, but also has built into it by irradiating according to this invention a permanently-set reduced elongation which has never been attained heretofore.

Figure 1:
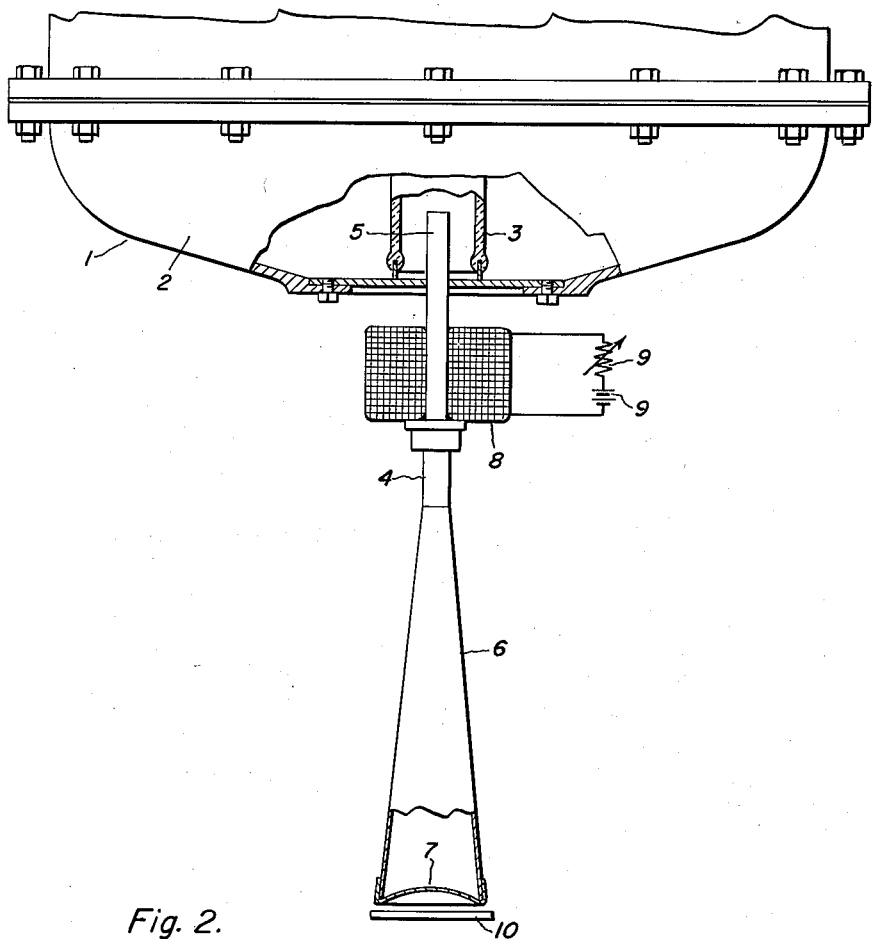
Fig. 1 is a partially sectionalized, simplified view of an electron accelerator apparatus useful in practicing the invention.

Referring particularly now to Fig. 1, there is shown high voltage accelerating apparatus 1 capable of producing a beam of high energy electrons for irradiating nylon materials in accordance with the invention. High voltage accelerating apparatus 1 may be of the type disclosed in United States Patent No. 2,144,518, patented by William F. Westendorp on January 17, 1939, and assigned to the same assignee of the present invention. In general, this apparatus comprises a resonant system having an open-magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 17, pp. 128-133 (December 1944).

To permit utilization of the high energy electrons accelerated down envelope 3, there is provided an elongated metal tube 4, the upper portion 5 of which is hermetically sealed to tank 2, as illustrated, by any convenient means such as silver solder. The lower portion 6 of tube 4 is conical in cross-section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies of about 230,000 electron volts or greater. Beryllium and other materials of low stopping power may also be employed with efficacy. By forming end-window 7 in arcuate shape as shown, greater strength for resisting the force of atmospheric pressure may be obtained for a given window thickness. Desired focusing of the accelerated electrons may be secured by a magnetic-field generating winding 8 energized by a source of direct current 9' through a variable resistor 9.

In producing irradiated nylon according to the invention, a sheet 10 of nylon material is supported in the path of the electrons emerging from end-window 7 as illustrated. The high energy electrons penetrate the nylon material to a depth dependent upon their energy and effect modifications in the properties of the material. Of course, sheet 10 can be in the form of strip material which is passed continuously under end-window 7 at a velocity selected to give the desired irradiation dosage. Various expedients for obtaining the irradiation of the polymeric materials in other shapes (such as containers, bottles, threads, cords, cloth, etc.) will be apparent to those skilled in the art. Uniform treatment of nylon materials having appreciable thickness can be assured by irradiating them first from one side and then the other, or from both sides simultaneously. In certain instances it may be desirable to irradiate the nylon materials in an atmosphere of nitrogen, argon, helium, krypton or xenon, etc., to prevent effects from any corona which may be present.

It will be readily realized that other forms of electron accelerating apparatus may be employed instead of high voltage apparatus 1; for example, linear accelerators of the type described by J. C. Slater in the "Reviews of Modern Physics," vol. 20, No. 3, pp. 473-518 (July 1948) may be utilized. To decrease wasteful energy absorption between the point of exit of electrons from the accelerating apparatus and the polymeric materials, a vacuum chamber having thin entrance and exit windows may be inserted in the space.

In general, the energy of the irradiation preferably employed in the practice of my invention may range from about 50,000 to 20 million electron volts or higher depending upon materials. The preferable range is 100,000 to 10 million electron volts. Although high energy electron irradiation is preferred since it produces a large amount of easily controllable high energy, ionizing radiation within a short period of time without rendering the product radioactive, many other sources of high energy, ionizing radiation can also be used in my invention. Examples of such ionizing radiation sources are gamma rays, such as can be obtained from $Co^{60}$, "burnt" uranium slugs, fission by-products, such as waste solution, separated isotopes, such as $Cs^{137}$, gaseous fission products liberated from atomic reactions, etc.; other electron sources, such as the betatron, etc.; fast or slow neutrons or the mixed neutron and gamma radiation, such as is present in certain atomic reactors; X-rays; and other miscellaneous sources, such as protons, deuterons, $\alpha$-particles, fission fragments, such as are available from cyclotrons, etc.

The most commonly employed units for measuring high energy radiation are (1) Roentgen units and (2) Roentgen equivalent physical units. Roentgen units are more commonly used to measure gamma and X-rays and are usually defined as the amount of radiation that produces one electrostatic unit of charge per milliliter of dry air under standard conditions. The Roentgen equivalent physical unit (the "rep.") is a convenient unit which usually describes the radiation dose from other than gamma or X-rays, and is the measure of the ionization in the absorber or tissue. The ionization produced by primary radiation is expressed as one rep. when the energy lost in tissue is equivalent to the energy lost by the absorption of one Roentgen of gamma or X-rays in air. Further definitions of "Roentgen" and "rep." can be found on p. 256 of "The Science and Engineering of Nuclear Power," edited by Clark Goodman (1947), and on p. 436 of "Nuclear Radiation Physics," by Lapp and Andrews (1948). For convenience, the term "Roentgen equivalent physical" or "rep." will be used in the specification and appended claims.

The suitable radiation dose employed in carrying out this invention will of course depend on the properties desired in the irradiated products and the particular nylon employed; for example, doses of above $1 \times 10^6$ rep., such as from about $1 \times 10^6$ to $1 \times 10^8$ rep. but preferably $3 \times 10^6$ to $50 \times 10^6$ rep. can be employed. The temperature during irradiation is advantageously from 60° C. to just below the melting point of the nylon but preferably from 75° to 225° C.

After irradiation in the lower temperature ranges, nylon is immediately annealed by any suitable means such as by passing through a heated post-irradiation zone. By "immediately annealing" I mean annealing before a substantial amount of oxygen has an opportunity to react with the trapped free radicals so as to oxidize the polymer. Preferably, the irradiated polymer should be annealed at from 100° C. to about 225° C. or just below the melting point of the polymer. One method of assuring against oxidative attack is to irradiate and thereafter retain nylon in an inert atmosphere until it is annealed. Where the irradiated polymer is kept out of contact with oxygen or air, delay in annealing will not have any deleterious effects.

In order that those skilled in the art may better understand how the present invention may be practiced, the following example is given by way of illustration and not by way of limitation. All parts are by weight. The apparatus employed was that described in Fig. 1 with 800 kvp. electrons (kvp. refers to the peak voltage in kilovolts generated by the inductance coil with high voltage apparatus 1 during the conducting half cycle and thus a measure of the energy employed from window 7). The particular nylon used in the following example (except in Examples 8 through 11), as exemplary of nylons, was a 10 mil sheet of Nylon 66, a polyamide produced by reacting hexamethylene diamine with adipic acid. In Examples 8 through 11 Nylon 4, prepared from butyrolactam, was employed.

Solubility measurements were used in the following examples to determine the percent of cross-linked nylon produced by irradiation. Solubility measurements as a measure of percentage of cross-linking are based on the phenomenon that when nylon is subjected to irradiation, a principal effect is the formation of cross-links between molecular chains. At some minimum dose, the number of cross-links is sufficient to form gel particles insoluble in such solvents for nylon as hot p-cresol, while at higher doses the polymer is sufficiently gelled to resist disintegration in a hot solvent but still yields on swelling some solvent extractable materials.

The effect of irradiation on solubility measurements was determined as follows: A weighed piece of irradiated nylon which could have for example, the following measurements: .010" thickness x 1.25" diameter, was immersed in a solvent for nylon, such as about one liter of p-cresol, and heated at 60° C. for several hours or more to ensure complete extraction. The test piece was then removed from the solvent, washed in a methanol bath for several hours to remove the p-cresol and then dried to constant weight under reduced pressure. Percent weight loss is equal to $$\frac{\text{(Initial weight)} - \text{(final weight)}}{\text{Initial weight}} \times 100$$

The percent of cross-linked material equals 100 minus the percent weight loss. p-Cresol was used in the following examples except in Examples 8 through 11 where formic acid was used.

EXAMPLE 1

This example illustrates the effect of temperature during irradiation on the percent of cross-linked nylon produced by irradiation.

Figure 2:
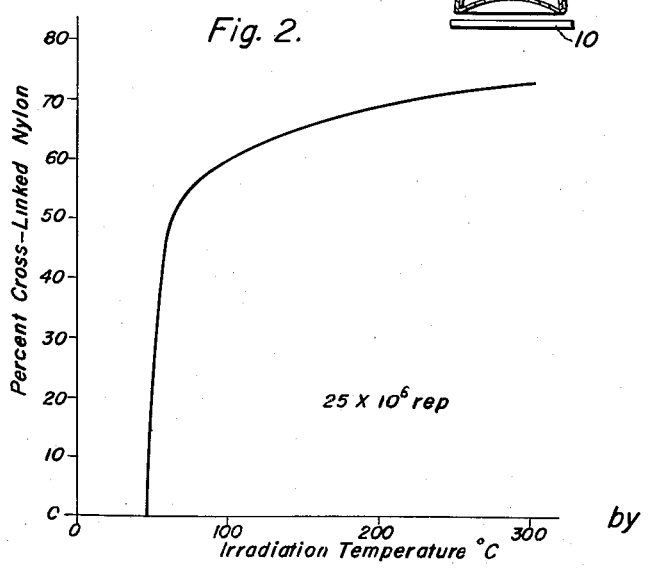
Fig. 2 is a graph wherein is plotted the percent of cross-linked nylon formed at a constant dose ($25 \times 10^6$ rep.) as a function of temperature during irradiation.

Sections of nylon were irradiated to a dose of $25 \times 10^6$ rep. over the temperature range shown in Fig. 2 which is a graph wherein is plotted the percent of cross-linked nylon formed at a constant dose as a function of temperature during irradiation. From Fig. 2 it can be seen that (1) at this irradiation dose little or no cross-linking occurs unless the material is irradiated above 60° C.; (2) although no cross-linked polymer was formed at 50° C., the amount of cross-linking at 75° C. was 52%; and (3) that above 100° C. and up to the crystal melting point of nylon (about 255° C.) the percent of cross-linked polymer was between about 65-70%. It was entirely unexpected that there should be such little difference between the cross-linking efficiency at 100-255° C. Rather it was expected that as the temperature was raised an enhancement in cross-linking would be observed due to a reduction in crystallinity.

EXAMPLE 2

Figure 3:
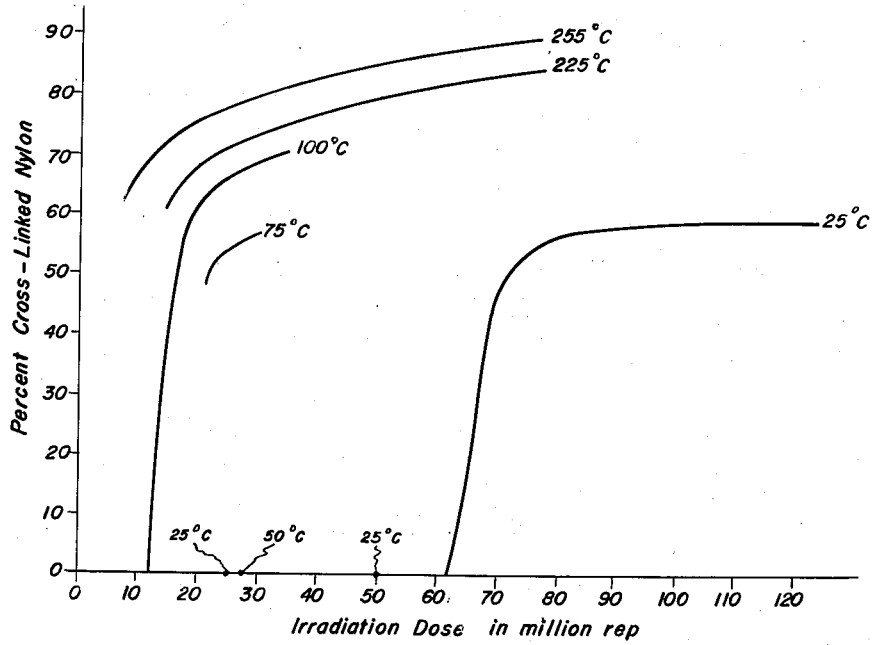
Fig. 3 is a graph wherein percent of cross-linked nylon is plotted as a function of irradiation dose at various temperatures.

This example illustrates the percent of cross-linked material formed as a function of irradiation dose at various temperatures. In this example, nylon was irradiated at 25° C., 50° C., 75° C., 100° C., 225° C. and 255° C. over the dose range shown in Fig. 3 a graph wherein percent of cross-linked polymer is plotted as a function of irradiation dose at these temperatures. From Fig. 3 it is noted that the gel point at 25° C. is between $60 \times 10^6$ and $70 \times 10^6$ rep. It was unexpected that increased irradiation above $70 \times 10^6$ rep. at 25° C. did not result in further increased cross-linking. This leveling off of cross-linking above $70 \times 10^6$ rep. at 25° C. appears to indicate that the presence of a competing degradation reaction which is not present at elevated temperatures. In contrast, increasing the irradiation dosage at an elevated temperature resulted in an increase in cross-linking. It can also be seen in Fig. 3 that when nylon is irradiated at 75° C. or higher that the percent of cross-linked material produced at a dose of $25-30 \times 10^6$ rep. is greater than can be produced at 25° C. by an irradiation dose which is two or more times as great. The points which are not part of any curve are the cross-linked values obtained by irradiating at the indicated temperatures.

EXAMPLE 3

A significant and unexpected change in the properties of nylon effected by irradiation according to this invention is the reduction in elongation without a reduction in yield tensile or ultimate tensile strength in the useful temperature range. In other words, it is possible to reduce the objectionable stretch in nylon by a substantial amount, a property which is important in the application of nylon cord to tires. This is effected without the necessity of stretching the nylon as is done in the heat treatment processes. This improvement is shown in the following example.

Figure 4:
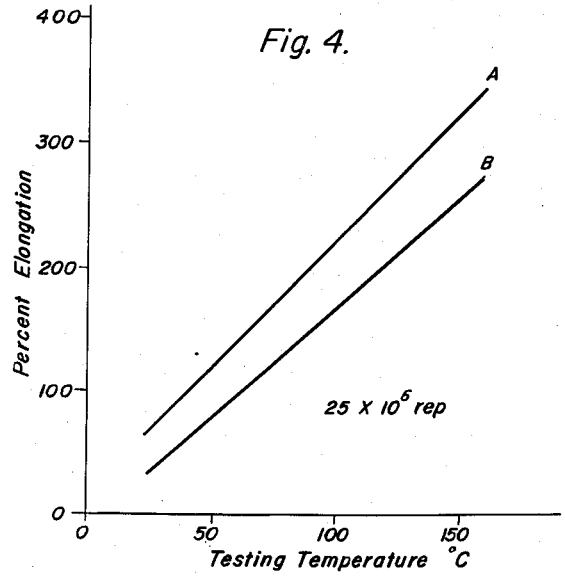
Fig. 4 is a graph wherein the percentage elongation of unirradiated nylon (curve A) and nylon irradiated according to this invention (curve B) are plotted as a function of testing temperature.

Sections of nylon were irradiated with $25 \times 10^6$ rep. at 100° C. and their percentage elongation measured over the temperature range shown in Fig. 4. As a control, similar measurements were taken on unirradiated nylon over the same temperature range. These results are shown in Fig. 4, a graph wherein the percent elongation of unirradiated and irradiated ($25 \times 10^6$ rep. at 100° C.) nylon are plotted as a function of testing temperature. In Fig. 4, A is the curve for unirradiated nylon and B, irradiated nylon. From this graph, it is evident that a reduction in percent elongation is noted when nylon is irradiated according to this invention. This permanently reduced elongation is unaffected by heating. In regard to other properties, it was unexpectedly discovered that little, if any, change over the same testing temperature range in the yield tensile strength and ultimate tensile strength was noted for nylon irradiated under the same conditions as compared to unirradiated nylon.

A similar reduction in percent elongation without change in yield or ultimate tensile strength is also effected when nylon is irradiated with the same radiation dosage and subsequently annealed above 100° C.

The following examples illustrate that free radicals trapped in nylon when irradiated at 25° C., instead of oxidizing the polymer, are freed by annealing to further cross-link the polymer.

Four thin sections of nylon were irradiated at 25° C. to a dose of $25 \times 10^6$ rep. Example 4, used as a control, was not annealed. Examples 5, 6, and 7 were annealed at 100° C., 150° C., and 255° C., respectively. The percent of cross-linked polymer was determined by solvent extraction. The results are presented in Table I.

*Table I*

| Example | Anneal Temperatures, °C. | Percent of Cross-linked Polymer |
|---|---|---|
| 4 | no anneal | 0 |
| 5 | 100° | 8 |
| 6 | 150° | 35 |
| 7 | 225° | 68 |

From this table it is evident that annealing enhances the cross-linking effectiveness of room temperature irradiation, and that annealing at 225° C. is more effective than annealing at lower temperatures.

The following examples illustrate that nylons prepared from lactams can be more effectively irradiated at elevated temperatures than at room temperature. Films of Nylon 4, prepared by hydrolyzing butyrolactam, were irradiated at various temperatures to a dose of $50 \times 10^6$ rep. Example 8 was not irradiated, Examples 9, 10, and 11 were irradiated at 25° C., 100° C., and 150° C., respectively. These were then extracted at room temperature with formic acid to determine the degree of cross-linking. Formic acid is such an excellent room temperature solvent for uncross-linked polymer that films may be cast from its solutions. The results are presented in Table II.

Table II

| Example | Irradiation Temperature, °C. | Solubility of Product |
| --- | --- | --- |
| 8 | not irradiated | dissolves rapidly. |
| 9 | 25° | gel slurry. |
| 10 | 100° | insoluble, swells, remains in one piece. |
| 11 | 150° | Do. |

In addition to the above examples, it should be understood that my invention is also applicable to other nylons, for example Nylon 610 (prepared from hexamethylene diamine and sebacic acid), Nylon 6 (prepared from caprolactam), Nylon 11 (prepared from ω-aminoundecanoic acid), and other analogous amino acids and lactams.

The products of this invention can be used in those applications where unirradiated nylon or nylon irradiated at room temperature had heretofore been used, taking into consideration the fact that the products of this invention possess improved insolubility, infusibility, etc.

In addition, nylon irradiated according to this invention can be employed where the additional properties obtained such as reduced susceptibility to oxygen, decreased elongation, etc. are particularly desirable, for example, as filaments, cords, films, insulation for electrical conductors, gaskets, containers, clothes, linings, conduits, etc.

What I claim as new and desire to secure by Letters Patent of the United States is:

1. Irradiated nylon possessing reduced susceptibility toward oxidation and reduced elongation comprising the product produced by claim 2.

2. A process of preparing nylon possessing reduced susceptibility toward oxidation and reduced elongation which comprises irradiating nylon with ionizing radiation having energy equivalent to at least $5 \times 10^4$ electron volts to a radiation dose of $1 \times 10^6$ to $1 \times 10^8$ rep. in the range of 100°–225° C. so as to substantially release all of the radiation-induced free radicals.

3. A process of preparing nylon possessing reduced susceptibility toward oxidation and reduced elongation which comprises irradiating nylon to a radiation dose of $1 \times 10^6$ to $1 \times 10^8$ rep. with ionizing radiation having energy equivalent to at least $5 \times 10^4$ electron volts at a temperature of from about 100° C. to just below the melting point of the nylon to release substantially all of the radiation-induced free radicals.

4. A process of preparing nylon possessing reduced susceptibility toward oxidation and reduced elongation which comprises (1) irradiating nylon below 100° C. to a radiation dose of $1 \times 10^6$ to $1 \times 10^8$ rep. with ionizing radiation having energy equivalent to at least $5 \times 10^4$ electron volts and (2) thereupon heating said irradiated nylon to a temperature selected from a range of 100° C. to 255° C. to release substantially all of the trapped free radicals before a perceptible amount of oxygen can react with the irradiated nylon.

5. A process of preparing nylon possessing reduced susceptibility toward oxidation and reduced elongation which process comprises (1) irradiating nylon below 100° C. and with electrons having energy equivalent to at least $5 \times 10^4$ electron volts to a radiation dose of $1 \times 10^6$ to $1 \times 10^8$ rep. and (2) thereupon heating said irradiated nylon to an elevated temperature selected from the range of from 100° C. to just below the melting point of nylon to release substantially all of the trapped free radicals before a perceptible amount of oxygen can react with the irradiated nylon.

6. The method of substantially improving the oxidation resistance of nylon which has been irradiated to a radiation dose in the range $1 \times 10^6$ to $1 \times 10^8$ rep. with ionizing radiation having energy equivalent to at least $5 \times 10^4$ electron volts and to increase the effectiveness of the radiation process which comprises maintaining the nylon at a temperature in the range of 100° C. to just below the softening point of the nylon while it is being irradiated so as to substantially prevent the retention of free radicals in the irradiated nylon.

7. The method of substantially improving the oxidation resistance of nylon which has been irradiated at a temperature below 100° C. with ionizing radiation having energy equivalent to at least $5 \times 10^4$ electron volts to a radiation dose of $1 \times 10^6$ to $1 \times 10^8$ rep. and to increase the effectiveness of the irradiation process which comprises heating the nylon, after it has been irradiated, to a temperature selected from the range of 100° C. to 255° C. to release substantially all of the trapped free radicals before a perceptible amount of oxygen can react with the irradiated nylon.

8. The method as in claim 6 wherein high energy electrons are the source of the ionizing radiation.

9. The method as in claim 7 wherein high energy electrons are the source of the ionizing radiation.

10. The method as in claim 6 wherein the nylon is irradiated to a radiation dose of $3 \times 10^6$ to $50 \times 10^6$ rep.

11. The method as in claim 7 wherein the nylon is irradiated to a radiation dose of $3 \times 10^6$ to $50 \times 10^6$ rep.

12. The method as in claim 8 wherein the nylon is irradiated with high energy electrons to a radiation dose of $3 \times 10^6$ to $50 \times 10^6$ rep.

13. The method as in claim 9 wherein the nylon is irradiated with high energy electrons to a radiation dose of $3 \times 10^6$ to $50 \times 10^6$ rep.

14. The method as in claim 10 wherein the ionizing radiation has energy equivalent to 0.05 to 20 mev.

15. The method as in claim 11 wherein the ionizing radiation has energy equivalent to 0.05 to 20 mev.

16. The method as in claim 12 wherein the electrons have energy equivalent to 0.05 to 20 mev.

17. The method as in claim 13 wherein the electrons have energy equivalent to 0.05 to 20 mev.

References Cited in the file of this patent

FOREIGN PATENTS 64,800     France _____ June 29, 1955
(Addition to No. 1,079,401)

OTHER REFERENCES

Lawton et al.: "Nature," vol. 172, pp. 76 and 77, July 11, 1953.

Nature, vol. 170, December 1952, pp. 1075–76.

Modern Plastics, vol. 31, April 1954, pp. 100, 101, 219.

Chemical Engineering, vol. 62, September 1955, pp. 228, 230, 232, 234.

Modern Plastics, vol. 32, September 1954, page 229.